United States Patent
Logunov et al.

(10) Patent No.: US 10,215,914 B2
(45) Date of Patent: Feb. 26, 2019

(54) LIGHT-DIFFUSING OPTICAL FIBER HAVING NANOSTRUCTURED INNER AND OUTER CORE REGIONS

(71) Applicant: Corning Incorporated, Corning, NY (US)

(72) Inventors: Stephan Lvovich Logunov, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 530 days.

(21) Appl. No.: 14/919,034

(22) Filed: Oct. 21, 2015

(65) Prior Publication Data

US 2016/0116671 A1 Apr. 28, 2016

Related U.S. Application Data

(60) Provisional application No. 62/067,647, filed on Oct. 23, 2014.

(51) Int. Cl.
*G02B 6/02* (2006.01)
*F21V 8/00* (2006.01)
*G02B 6/036* (2006.01)

(52) U.S. Cl.
CPC ......... *G02B 6/02338* (2013.01); *G02B 6/001* (2013.01); *G02B 6/002* (2013.01); *G02B 6/0229* (2013.01); *G02B 6/03611* (2013.01); *G02B 6/03622* (2013.01); *G02B 6/03638* (2013.01); *G02B 6/03688* (2013.01)

(58) Field of Classification Search
CPC ...... G02B 6/001; G02B 6/002; G02B 6/0229; G02B 6/03611; G02B 6/02338; G02B 6/03622; G02B 6/03638; G02B 6/03688; G02B 6/03694; G02B 6/03644
USPC ............ 385/123–128, 901; 362/84, 552, 558
See application file for complete search history.

(56) References Cited

U.S. PATENT DOCUMENTS

| | | |
|---|---|---|
| 7,450,806 B2 | 11/2008 | Bookbinder et al. |
| 8,545,076 B2 | 10/2013 | Bickham et al. |
| 8,591,087 B2 | 10/2013 | Bickham et al. |

(Continued)

FOREIGN PATENT DOCUMENTS

WO 2009140025 11/2009

OTHER PUBLICATIONS

International Search Report and Written Opinion of the International Searching Authority; PCT/US2015/056549; dated Feb. 1, 2016; 12 Pages.

*Primary Examiner* — Michael Mooney (57) ABSTRACT

A light-diffusing optical fiber having nanostructured inner and outer core regions is disclosed. The nanostructured inner core region is defined by a first configuration of voids that defines a first amount of light scattering. The outer core region is defined by a second configuration of voids that defines a second amount of light scattering that is different from the first amount of light scattering. A cladding surrounds the nanostructured core. Light scattered out of the inner core region scatters from the outer core region and then out of the cladding as scattered light. Selective bending of the light-diffusing optical fiber is used to define a bending configuration that allows for tailoring the intensity distribution of the scattered light emitted from the fiber as a function of the length of the fiber.

19 Claims, 7 Drawing Sheets

(56) References Cited

U.S. PATENT DOCUMENTS

| | | |
|---|---|---|
| 2010/0238374 A1 | 9/2010 | Ohse |
| 2011/0305035 A1 | 12/2011 | Bickham |
| 2012/0275178 A1 | 11/2012 | Logunov |
| 2012/0275180 A1 | 11/2012 | Button |
| 2012/0275745 A1 | 11/2012 | Logunov |
| 2013/0088888 A1 | 4/2013 | Fewkes et al. |
| 2013/0156391 A1* | 6/2013 | Logunov ................ G02B 6/001 385/123 |
| 2013/0272014 A1 | 10/2013 | Logunov et al. |
| 2013/0294106 A1 | 11/2013 | Logunov |
| 2014/0092623 A1 | 4/2014 | Logunov |
| 2014/0355295 A1* | 12/2014 | Kuchinisky ............ G02B 6/001 362/558 |

* cited by examiner

LIGHT-DIFFUSING OPTICAL FIBER HAVING NANOSTRUCTURED INNER AND OUTER CORE REGIONS

CROSS-REFERENCE TO RELATED APPLICATIONS

This application claims the benefit of priority under 35 U.S.C. § 119 of U.S. Provisional Application Ser. No. 62/067,647 filed on Oct. 23, 2014, the content of which is relied upon and incorporated herein by reference in its entirety.

FIELD

The disclosure is generally directed to light-diffusing optical fibers, and in particular to a light-diffusing optical fiber that has nanostructured inner and outer core regions.

BACKGROUND

Certain types of light-diffusing optical fibers are configured to scatter light radially outwards as the light propagates down the length of the optical fiber. Such fibers are particularly useful for a number of applications, such as special lighting, photochemistry, and for various types of electronic devices and display-based devices.

One problem with light-diffusing optical fibers is that the light scattering reduces the uniformity of the light as a function of distance down the fiber from the light source. To obtain uniform illumination along the length of a light-diffusing optical fiber, one needs either to use two light sources on either ends of the fiber, to use a reflector at one end of the fiber, or to use a sufficiently short section of the fiber. These approaches to obtaining uniform illumination are expensive and add to the system cost, and having other shortcomings and limitations.

SUMMARY

An aspect of the disclosure is a light-diffusing optical fiber that has a nanostructured core. The nanostructured core has a nanostructured inner core region having a refractive index $n_{30}$ and is defined by a first configuration of voids that defines a first amount of light scattering. The nanostructured core also has at least one nanostructured outer core region that surrounds the central nanostructured inner core region and that has a refractive index $n_{50}$ and that is defined by a second configuration of voids that defines a second amount of light scattering that is different from the first amount of light scattering. The light-diffusing optical fiber also includes a cladding that surrounds the nanostructured core.

Another aspect of the disclosure is a light-diffusing optical system that includes the light-diffusing optical fiber described above and a light source optically coupled to the light-diffusing optical fiber.

Another aspect of the disclosure is a light-diffusing optical fiber that includes: a nanostructured inner core region having a first nanostructure morphology of voids that defines a first amount of light scattering; a nanostructured outer core region that surrounds the inner core region and that has a second nanostructure morphology of voids that defines a second amount of light scattering; and an isolation region disposed between the nanostructured inner and outer core regions and having an annular width 1 µm≤Δr≤10 µm; and a cladding region surrounding the nanostructured outer core region.

Another aspect of the disclosure is a light-diffusing optical system that includes the light-diffusing optical fiber as described above, wherein the light-diffusing optical fiber has a bend configuration that includes at least one bend, and that also includes a light source optically coupled to the light-diffusing optical fiber.

Another aspect of the disclosure is a method of providing illumination from a light-diffusing optical fiber having an outer surface. The method includes: coupling light into a nanostructured core of the light-diffusing optical fiber, wherein the nanostructured core has a nanostructured inner core region having a first amount of light scattering and a nanostructured outer core region that surrounds the nanostructured inner core region and having a second amount of light scattering that is different from the first amount of light scattering; allowing the light to propagate down a length of the nanostructured core and scatter from the nanostructured core as scatted light that exits the outer surface of the light-diffusing optical fiber; and bending the light-diffusing optical fiber to cause light to be transferred from the nanostructured inner core region to the nanostructured outer core region, thereby increasing an amount of scattered light exiting the outer surface as compared to not bending the light-diffusing optical fiber.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The claims are incorporated into and constitute part of this specification. The drawings illustrate various embodiments and together with the description serve to explain the principles and operation.

DETAILED DESCRIPTION

Reference is now made in detail to the preferred embodiments of the disclosure, examples of which are illustrated in the accompanying drawings. Whenever possible, like reference numbers are used to refer to like components or parts. Cartesian coordinates are shown in some of the Figures by way of reference.

The discussion below makes reference to the light-diffusion optical fiber disclosed herein as having "voids," which are randomly arranged and randomly sized, and are also referred to in the art as "random air lines" or "nano structures" or "nano-sized structures." Examples of optical fibers having such voids are described in U.S. Pat. No. 7,450,806, and in U.S. Pat. No. 8,591,087, which patents are incorporated by reference herein.

Also in the discussion below, the term "refractive index profile," as used herein, is the relationship between the refractive index n and the radius of the fiber.

In addition, the term "relative refractive index," as used herein, is defined as:

$$\Delta(r)\% = 100 \times [n(r)^2 - n_{REF}^2]/2n(r)^2,$$

where n(r) is the refractive index at radius r, unless otherwise specified. In some embodiments, the refractive index can be defined as a step index, i.e $\Delta(r)\% = \square_1\%$ for $r<r_0$ and $\Delta(r)\% = i\square_0\%$ for $r>r_0$, wherein $\square_1\% > \square_0\%$ and where $r_0$ is core radius. The relative refractive index percent is defined at 850 nm unless otherwise specified. In one aspect, the reference index $n_{REF}$ is silica glass with the refractive index of 1.452498 at 850 nm. In another aspect, $n_{REF}$ is the maximum refractive index of the cladding at 850 nm. As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "updopant," as used herein, refers to a dopant which raises the refractive index of glass relative to pure undoped $SiO_2$. The term "downdopant," as used herein, is a dopant which has a propensity to lower the refractive index of glass relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

Example Configurations

Figure 1:
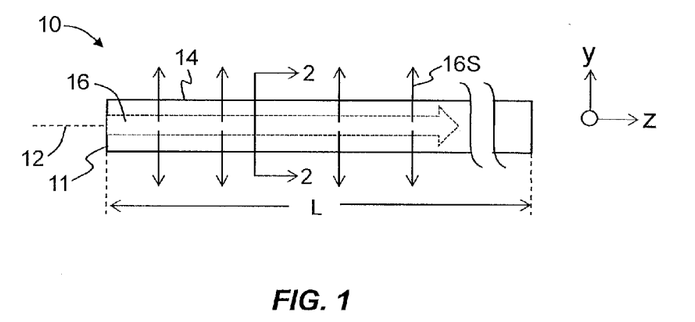
FIG. 1 is a side view of an example light-diffusing optical fiber as disclosed herein, showing light traveling in the fiber and beings scattered (diffused) from the fiber.

FIG. 1 is a side view of an example light-diffusing optical fiber 10, which has an input end 11, a central axis or centerline 12 and an outside surface 14. Light 16 is shown as traveling in the z-direction within the light-diffusing optical fiber and being scattered out of the outside surface 14 as scattered light 16S. The light-diffusing fiber 10 has a length L.

Figure 2:
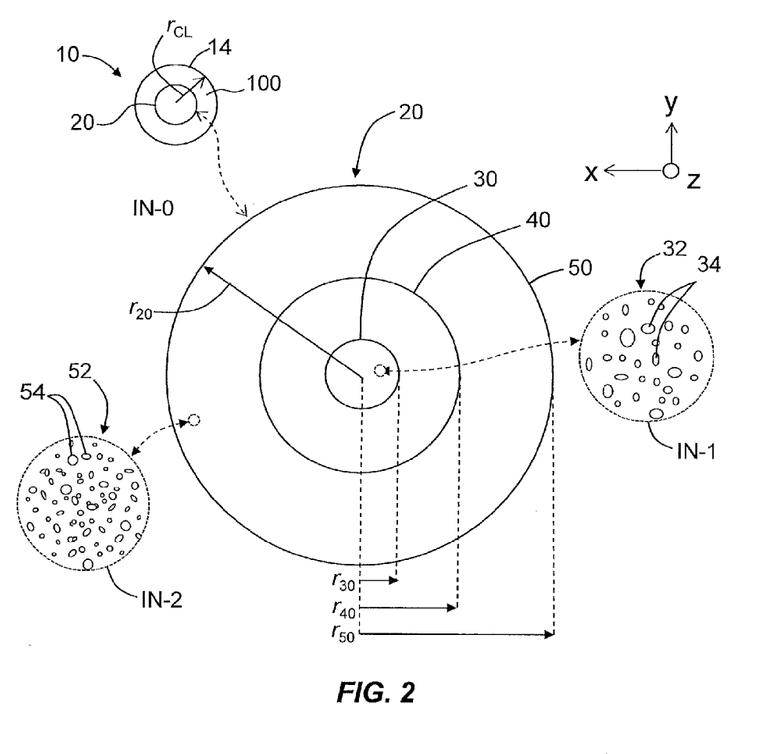
FIG. 2 is a cross-sectional view taken along the line 2-2 in FIG. 1 and illustrates an example configuration of the light-diffusing optical fiber, and shows in two close-up insets (I1 and I2) different void structures (i.e., nanostructure morphologies) for the nanostructured inner and outer cores.

FIG. 2 is a cross-sectional view of the example light-diffusing optical fiber 10 as taken along the line 2-2 in FIG. 1. The light-diffusing optical fiber 10 has an inner core section ("core") 20, and an outer cladding 100, which in one embodiment is made of a low-index polymer. The outer cladding 100 has a radius $r_{CL}$.

The core 20 is shown in the close-up inset IN-0 and has a radius $r_{20}$. The core 20 includes a central or inner core region ("inner core") 30 that has a radius $r_{30}$, an optional isolation region 40 that surrounds the center core region and that has a radius $r_{40}$, and an annular outer core region ("outer core") 50 that surrounds the middle annular core region and that has a radius $r_{50}$.

The inner core 30 has a refractive index $n_{30}$ and includes a first nanostructure morphology 32 defined by randomly arranged and randomly sized voids 24 (close-up inset IN-1) that define a first amount of scattering. The outer core 50 has a refractive index $n_{50}$ and includes a second nanostructure morphology 52 defined by randomly arranged and randomly sized voids 54 (close-up inset IN-2) that define a second amount of scattering that is different than the first amount of scattering.

The isolation region 40 has a refractive index $n_{40} > n_{30}$, $n_{50}$, and is substantially void free, e.g., is solid. In an example, isolation region 40 is made of either undoped silica or doped silica wherein the dopant is used to increase the refractive index $n_{40}$ to establish the condition $n_{40} > n_{30}$, $n_{50}$ (i.e., $n_{40} > n_{30}$, and/or $n_{40} > n_{50}$.)

Because core 20 includes voids, it is referred to hereinafter as "nanostructured core" 20. Likewise, the inner core 30 is referred to hereinafter as the "nanostructure inner core" 30, and the outer core 50 is referred to hereinafter as the "nanostructured outer core" 50. As discussed below, the nanostructured core 20 can include the nanostructured core 20 and one or more nanostructured outer cores 50, and in some instances in the discussion below, these regions are referred to as the "nanostructured regions" of the nanostructured core 20.

In an example, the cross-sectional size (e.g., diameter) of the voids 24 and 54 may be from about 10 nm to about 10 um and the length may vary from about 1 um to about 50 m. In some embodiments, the cross sectional size of the voids 24 and 54 is about 10 nm, 20 nm, 30 nm, 40 nm, 50 nm, 60 nm, 70 nm, 80 nm, 90 nm, 100 nm, 120 nm, 140 nm, 160 nm, 180 nm, 200 nm, 250 nm, 300 nm, 400 nm, 500 nm, 600 nm, 700 nm, 800 nm, 1 μm, 2 μm, 3 μm, 4 μm, 5 μm, 6 μm, 7 μm, 8 μm, 9 μm, or 10 μm. In some embodiments, the length of the voids 24 and 54 is about 1 μm, 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 200 μm, 300 μm, 400 pin, 500 μm, 600 μm, 700 μm, 800 μm, 900 μm, 1000 μm, 5 mm, 10 mm, 50 mm, 100 mm, 500 mm, 1 m, 5 m, 10 m, 20 m, or 50 m.

Figure 3A:
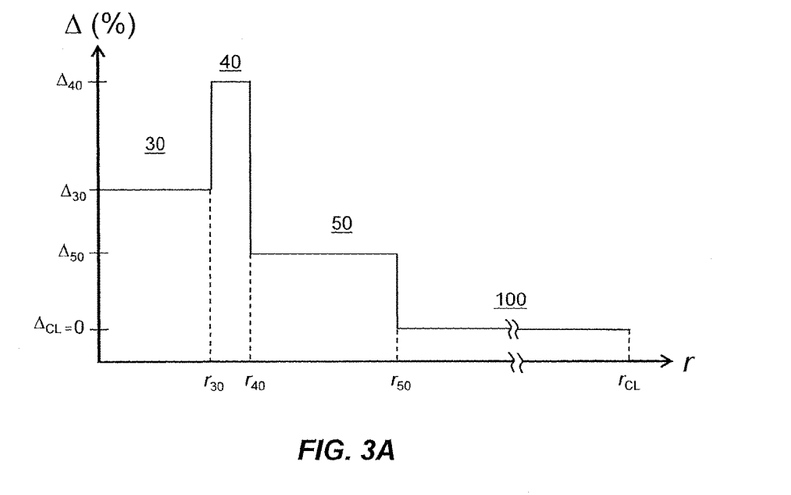
FIG. 3A is a plot of the relative refractive index Δ versus radius r for an example light-diffusing optical fiber according to FIG. 2.

FIG. 3A is a plot of the relative refractive index Δ(%) versus radius r for an example light-diffusing optical fiber 10 according to FIG. 2 and as disclosed herein that illustrates an example relative refractive index profile for the fiber. The nanostructured inner core 30 has an relative refractive index $\Delta_{30}$, the isolation region 40 has an relative refractive index of $\Delta_{40}$, the nanostructured outer core 50 has an relative refractive index of $\Delta_{50}$, and the cladding 100 has an relative refractive index $\Delta_{CL}$, which in the example profile is equal to zero. In one embodiment, nanostructured inner core 30 and nanostructured outer core 50 are pure silica or are silica doped with fluorine, while isolation region 40 is doped with an updopant to have an relative refractive index $\Delta_{40}$ in the range from 0.5% to 1%. Updoping of isolation region 40 can be performed using dopants such as $GeO_2$, $P_2O_5$, $Al_2O_3$ or other known updopants. In another embodiment, isolation region 40 is comprised essentially of silica, with the nanostructured inner core 30 and nanostructured outer core 50 comprised of silica regions In some embodiments, the nanostructured inner and outer cores 30 and 50 have respective numerical apertures (NAs) in the range from 0.1 to 0.6, which corresponds roughly to the output NAs of many light sources, such as diode lasers.

Figure 3B:
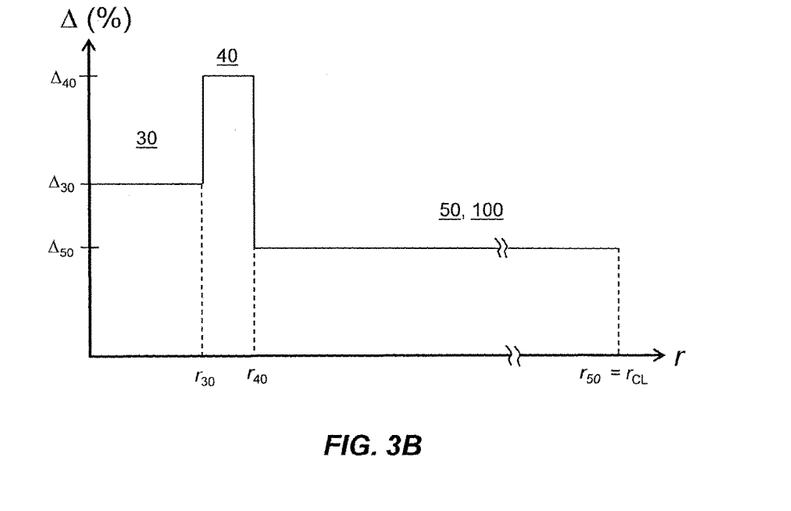
FIG. 3B is similar to FIG. 3A and illustrates an example relative refractive index profile wherein the nanostructure morphology of the nanostructured core extends into the cladding and constitutes at least a portion of the cladding.

FIG. 3B is similar to FIG. 3A and illustrates an example refractive index profile wherein the nanostructure morphology of the outer core 50 extends into the cladding and constitutes at least a portion of the cladding 100. In the example shown in FIG. 3B, $r_{50}=r_{CL}$ and $n_{40}=n_{50}$, i.e., the nanostructure morphology of the outer core 50 extends all of the way out to the edge of light diffusing optical fiber 10 and so also defines the cladding 100, i.e., the cladding is also nanostructured. In an example that combines the refractive index profiles of FIGS. 3A and 3B, the cladding 100 of FIG. 3A includes the nanostructure morphology of outer core 50, but the refractive index $n_{40}>n_{50}$.

In some cases, fluorine doping can be used in combination with the nanostructures to reduce the relative refractive index of one or both of the inner and outer cores 30 and 50.

As discussed above, the isolation region 40 is used to separate or isolate the nanostructured inner core 30 from the nanostructured outer core 50 and has an annular width $\Delta r = r_{40} - r_{30}$. In an example, the annular width Δr is in the range 0 μm≤Δr≤10 μm or 1 μm≤Δr≤10 μm. The case where Δr=0 is for an embodiment where there is no isolation region 40 between the inner and outer cores 30 and 50. When the isolation region 40 is employed, it is sized to allow for optical coupling of light 16 between the nanostructured inner core 30 and the nanostructured outer core 50 when the light-diffusing optical fiber 10 is perturbed, such as by bending or other means.

Nanostructured Core with Multiple Nanostructured Outer Cores

Figure 4A:
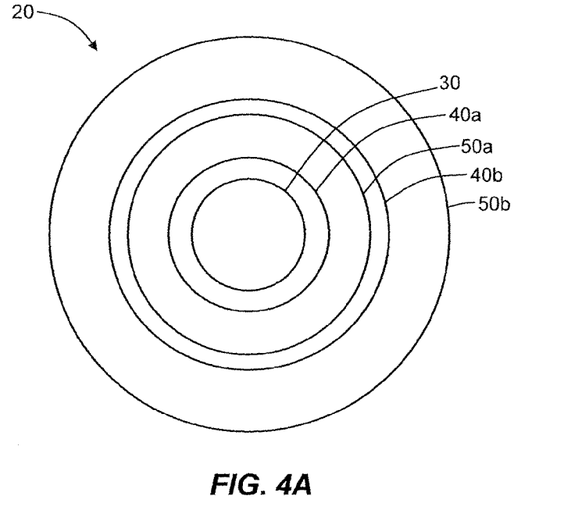
FIG. 4A is similar to FIG. 2 and illustrates an example embodiment wherein the nanostructured core includes two nanostructured outer cores and two isolation regions.
Figure 4B:
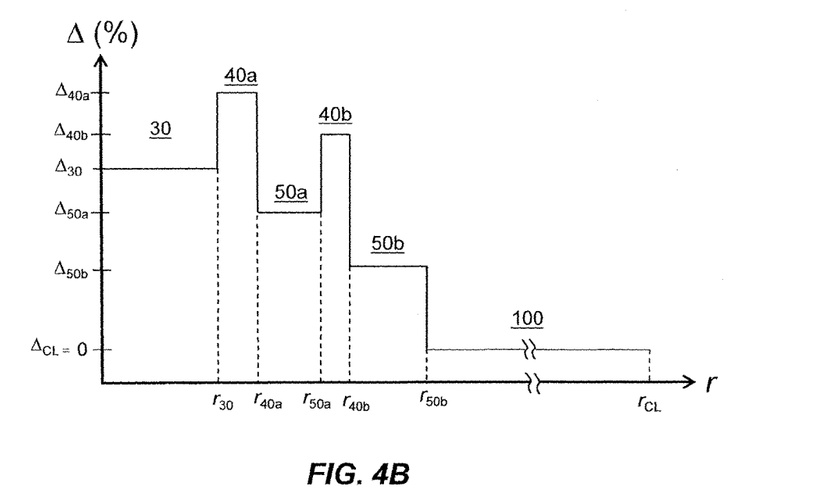
FIG. 4B is an example relative refractive index profile for an example light-diffusing optical fiber having the configuration of FIG. 4A.

FIG. 4A is similar to FIG. 2 and illustrates an example configuration of nanostructured core 20 of light-diffusing fiber 10 wherein the nanostructured core 20 includes two nanostructured outer cores 50a and 50b and two isolation regions 40a and 40b. An example relative refractive index profile for this configuration of light-diffusing optical fiber 10 is shown in the plot of FIG. 4B. The two nanostructured outer cores 50a and 50b have respective relative refractive indices $\Delta_{50a}$ and $\Delta_{50b}$ while the two isolation regions 40a and 40b have relative refractive indices $\Delta_{40a}$ and $\Delta_{40b}$.

One skilled in the art will recognize that the various relative refractive indices can be changed without adversely affecting the design, e.g., $\Delta_{40b}$ can be greater than $\Delta_{40a}$, and $\Delta_{50b}$ can be greater than $\Delta n_{50a}$, etc. The general embodiment of light-diffusing optical fiber 10 has a nanostructured inner core 30, at least one nanostructured outer core 50 (e.g., 50a, 50b, ...) and none, one, or more isolation region 40 (e.g., 40a, 40b, ...). In an example where there are N nanostructured outer cores 50, there are also N isolation regions 40. In another example, there are fewer than N isolation regions.

In the embodiment of light-diffusing optical fiber 10 of FIGS. 4A and 4B, the isolation regions 40a and 40b have respective annular width $\Delta r_a$ and $\Delta r_b$ (which need not be the same) and in an example embodiment, 1 μm≤$\Delta r_a$≤10 μm and 1 μm≤$\Delta r_b$≤10 μm.

Nanostructured Core without an Isolation Region

Figure 5A:
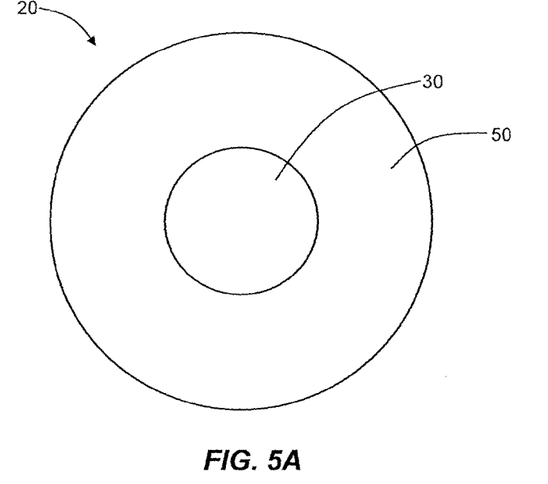
FIGS. 5A and 5B are similar to FIGS. 4A and 4B respectively and illustrate an example embodiment of the light-diffusing optical fiber disclosed herein wherein the nanostructured core does not include an isolation region.
Figure 5B:
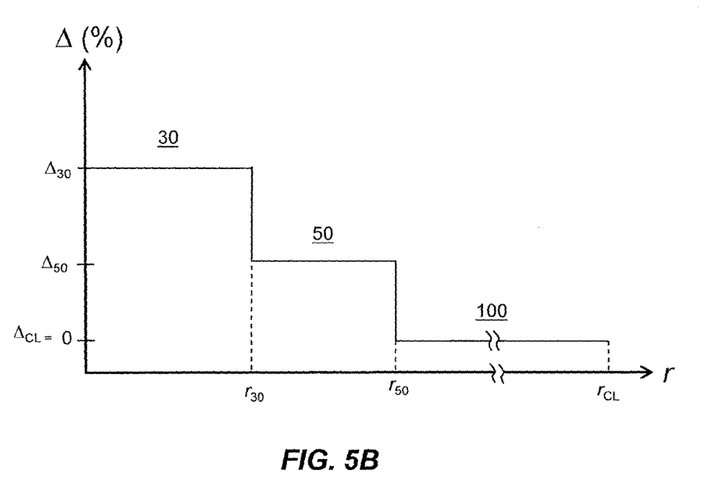

FIGS. 5A and 5B are similar to FIGS. 4A and 4B respectively, and illustrate an example embodiment of light diffusing optical fiber 10 wherein the nanostructured core 20 does not include an isolation region 40, so that the nanostructured outer core 50 immediately surrounds and is in intimate contact with the nanostructured inner core 30. This configuration provides for strong coupling of light 16 between the two regions when the light-diffusing optical fiber 10 is perturbed, e.g., bent, touched, flexed, etc.

With reference again to the example light-diffusing optical fiber 10 illustrated in FIG. 2, the amounts of light scattering in the nanostructured inner core 30 and the nanostructured outer core 50 is defined by the respective nanostructure morphologies 32 and 52 therein, which in turn are defined by the respective void parameters, such as the void fraction (% area of voids versus overall cross-sectional area), void diameter, void length, void density (i.e., number of voids per unit cross-sectional area), etc. For example, in FIG. 2, the nanostructure 32 of nanostructured inner core 30 is shown schematically in the inset IN-1 as having a larger mean void size and a smaller void density than the nanostructure 52 of nanostructured outer core 50 shown in inset IN-2.

In an example, the scattering loss in each of the nanostructured regions of nanostructured core 20 is substantially spectrally uniform in the wavelength range from 250 nm to 2000 nm and in another example is substantially spectrally uniform over the visible wavelength or "white light" spectral range (e.g., nominally from 380 nm to 750 nm).

Fabricating the Light-Diffusing Optical Fiber

The light-diffusing fiber 10 with its nanostructured core 20 can be fabricated using conventional fiber making processes. Conventional soot deposition processes, such as the outside vapor deposition (OVD) process or the vapor axial deposition (VAD) process can be used, where silica and doped silica particles are pyrogenically generated in a flame and deposited as soot. In the case of OVD, silica soot preforms are formed layer-by-layer by deposition of the particles on the outside of a cylindrical target rod by traversing the soot-laden flame along the axis of the cylindrical target. Such porous soot preforms are subsequently treated with a drying agent (e.g., chlorine) to remove water and metal impurities, and are then consolidated or sintered into glass blanks at temperatures ranging from 1,100 to 1,500° C.

Surface energy driven viscous flow sintering is the dominant mechanism of sintering, which results in densification and closing of the pores of the soot, thereby forming a consolidated glass perform. During the final stages of sintering, the gases used in consolidation may become trapped as the open pores are closed.

For making light-diffusing optical fiber 10 with nanostructured inner and outer cores 30 and 50, optical fiber preforms can be processed under consolidation conditions, which are effective in causing a significant volume fraction of gases being trapped in the consolidated glass blank, thereby causing the formation of non-periodically distributed voids in the consolidated glass optical fiber preform. In particular, by utilizing relatively low permeability gases (e.g., nitrogen, krypton, sulfur dioxide, etc.) and/or relatively high sintering rates, holes or voids can be trapped in the consolidated glass during the consolidation process. The sintering rate can be increased by increasing the sintering temperature and/or increasing the temperature ramp rate of the soot preform through the sintering zone of the consolidation furnace. These voids are typically discrete and have an isolated spheroid shape surrounded by silica. Each void is therefore non-continuous in the axial or radial position along the length of the optical preform. When the optical fiber preform is drawn into optical fibers, the voids are stretched along the fiber axial direction, thereby forming the non-continuous voids that define the respective nanostructure morphologies 32 and 52 of the inner and outer cores 30 and 50 of light-diffusing optical fiber 10.

In one embodiment of making light-diffusing optical fiber 10 with nanostructured inner and outer cores 30 and 50, a three step core making process is used. In the first step, to make the inner core 30, soot is deposited and subsequently consolidated into glass under process conditions that result in nanostructured voids 34 in the inner core. In the second step, the isolation region 40 is made by depositing soot on the consolidated preform of the inner core region and consolidating the deposited soot under process conditions that result in void-free isolation region. In the third step, the outer core region 50 is made by depositing soot on the composite preform of the inner core 30 and the isolation region 40 and consolidated to glass under process conditions that result in nanostructured voids 54 in the outer core 50.

In an example, the void-filled inner and outer core regions 30 and 50 are achieved by use of low-permeability gases (Krypton, Argon, Nitrogen, Oxygen, Sulfur dioxide, etc.) and fast sinter rates, while the void-free inner isolation region 40 is achieved by using high-permeability gases (e.g., He) and slow sinter rates. The consolidation process conditions in the first and third step are different and result in different nanostructure morphologies 32 and 52 in inner core 30 and outer core 50 respectively when the preform is drawn into light-diffusing optical fiber 10.

As noted above, the nanostructured inner and outer cores 30 and 50 have different nanostructure morphologies 32 and 52, as defined by the different configurations for voids 24 and 54. The different nanostructure morphologies 32 and 52 are obtained in some embodiments by either using different sintering gases (Kr, Ar, $N_2$, $O_2$, $SO_2$, etc.) in different airline regions or by using mixture of gases with different content in each region, as described above.

Table 1 through Table 4 below sets forth example void properties; in particular, the mean void size, the maximum void size, the void density (number (#) of voids/$\mu m^2$) and the void fill fraction (%) for different sintering gasses and for different draw tensions T(g).

TABLE 1

| | Mean void size (nm) | | |
|---|---|---|---|
| T(g) | $N_2$ | Kr | $SO_2$ |
| 100 | — | — | 96 |
| 200 | 230 | 180 | 59 |
| 250 | — | 170 | — |
| 300 | 170 | — | 47 |
| 400 | — | — | 36 |

TABLE 2

| | Maximum void size (nm) | | |
|---|---|---|---|
| T(g) | $N_2$ | Kr | $SO_2$ |
| 100 | — | — | 240 |
| 200 | 450 | 530 | 151 |
| 250 | — | 450 | — |
| 300 | 350 | — | 120 |
| 400 | — | — | — |

TABLE 3

| | Void density (#/$\mu m^2$) | | |
|---|---|---|---|
| T(g) | $N_2$ | Kr | $SO_2$ |
| 100 | — | — | 1.52 |
| 200 | 0.62 | 1.45 | 2.63 |
| 250 | — | 1.5 | — |
| 300 | 0.94 | — | 3.17 |
| 400 | — | — | — |

TABLE 4

| | Void fill fraction (%) | | |
|---|---|---|---|
| T(g) | $N_2$ | Kr | $SO_2$ |
| 100 | — | — | 1.1 |
| 200 | 3 | 4.9 | 0.72 |
| 250 | — | 4.2 | — |
| 300 | 2.5 | — | 0.55 |
| 400 | — | — | — |

In some embodiments such as described above, light-diffusing optical fiber 10 can be fabricated using different mixtures of gases when forming the nano structured inner core 30 and nanostructured outer core 50. The particular nanostructure morphology depends upon the particular combination of sintering gases used to form the voids, as well as the draw tension T. Table 5 below sets forth the example void parameters of void density $\rho$ (#/$\mu m^2$) and void fraction $F_V$ (%) for different example gas mixtures and for different maximum seed sizes $S_{MAX}$, mean seed sizes $<S>$ for a draw tension T of 300 g.

TABLE 5

Void parameters for different gas mixtures for T = 300 g.

| Mixture | $S_{MAX}$ | $<S>$ | $S_{90}$ | ρ (#/μm²) | $F_V$ (%) |
|---|---|---|---|---|---|
| 100% SO₂ | 116 nm | 42 nm | 63 nm | 3.79 | 0.525 |
| 50% SO2 + 50% Ar | 271 nm | 91 nm | 175 nm | 3.13 | 2.037 |
| Fluorine + 50% SO2 + 50% Kr | 169 nm | 75 nm | 114 nm | 2.26 | 0.998 |
| Fluorine + 42% SO2 + 58% Kr | 676 nm | 139 nm | 226 nm | 3.27 | 4.965 |
| Fluorine + 35% SO2 + 65% Kr | 428 nm | 114 nm | 205 nm | 4.75 | 4.848 |
| 50% SO2 + 25% Ar + 25% Kr | 148 nm | 59 nm | 104 nm | 2.68 | 0.732 |

With reference to FIG. 2, in one embodiment, the nanostructured core radius $r_{20}$ is in the range 50 μm≤$r_{20}$≤250 μm. In another embodiment, the radius $r_{30}$ of the nanostructured inner core is in the range $(0.1 \cdot r_{20} \leq r_{30} \leq (0.75) \cdot r_{20}$. In yet another embodiment, the annular width Δr of isolation region 40 is in the range 0≤Δr≤(0.2)·$r_{50}$. Also in an example, the ratio of the area $A_{30}$ of nanostructured inner core 30 to the area $A_{50}$ of the nanostructured outer core 50, which is given by $(r_{50}^2 - r_{40}^2)/r_{30}^2$, corresponds to the ratio of the respective amounts of scattering in the nanostructured inner and outer cores 30 and 50.

Since the scattering properties depend on these microstructure properties, the scattering characteristics of the nanostructured inner and outer cores 30 and 50 can be independently selected. The emission of high intensity scattered light 16S from over long length of light-diffusing optical fiber 10 can be managed by controlling the relative areas of nanostructured inner and outer cores 30 and 50 and the option isolation region 40, along with controlling the amount of optical power that is coupled in each of these regions of the nanostructured core.

In one embodiment, the amount of light scattering from the inner core 30 is greater than that of the outer core 50. In another embodiment, the amount of light scattering from the inner core 30 is less than that of the outer core 50.

Light-Diffusing Optical System

Figure 6A:
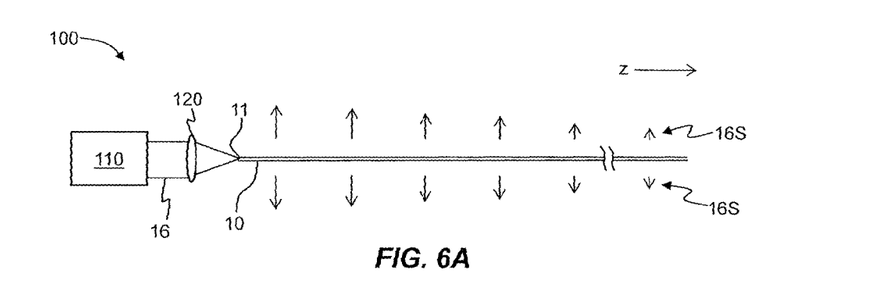
FIG. 6A is a schematic diagram of an embodiment of the light-diffusing optical system that utilizes the light-diffusing optical fiber disclosed herein.

FIG. 6A is a schematic diagram of an example light-diffusing optical system 100 that utilizes the light-diffusing optical fiber 10 disclosed herein. The light-diffusing optical system 100 includes a light source 110 optically coupled to input end 11 in a manner that substantially matches the numerical aperture (NA) of the fiber. Light source 110 emits light 16, which travels down the length of the light-diffusing optical fiber 10 while giving rise to scattered light 16S as described above and as also described in more detail below. In an example embodiment, the optical coupling of light 16 from light source 100 into light-diffusing optical fiber 10 is accomplished by an optical coupling system 120 operably arranged between the light source 110 and input end 11 of the light-diffusing optical fiber 10.

The light-diffusing optical system 100 is shown in FIG. 6A by way of example as extending straight in the z-direction. In this configuration, the light 16 traveling within light-diffusing optical fiber starts as being generally evenly distributed through nanostructured core 20. This is facilitated by the light-diffusing optical fiber 10 being highly multimode, e.g., supporting tens or hundreds of guided modes. As light 16 travels down the straight light-diffusing optical fiber 10, it interacts with the nanostructure 32 and 52 of the nanostructured inner and outer cores 30 and 50 respectively, thereby forming scattered light 16S that exits the outside surface 14 of the fiber (see also FIG. 1). The result is that the scattered light 16S diminished in intensity in the z-direction.

Figure 6B:
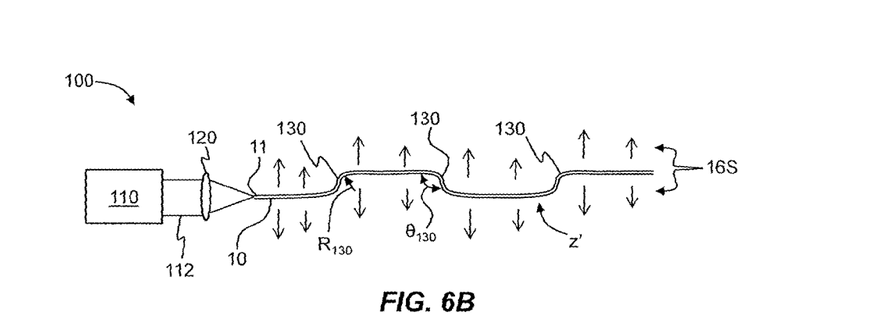
FIG. 6B is similar to FIG. 6A and illustrates an embodiment of the light-diffusing optical system wherein the light-diffusing optical fiber has a bend configuration that includes multiple (e.g., three) bends to facilitate light emission from the light-diffusing optical fiber.

FIG. 6B is similar to FIG. 6A and illustrates an example light-diffusing optical system 100 wherein the light-diffusing optical fiber 10 has a bend configuration that in the example shown includes three bends 130. The light 16 coupled into light-diffusing optical fiber 10 is distributed over the different guided modes to substantially uniformly fill nanostructured core 20. We define here a local coordinate z' that follows the now winding central axis 12 of light-diffusing optical fiber (see FIG. 1).

As the light travels in the first section of light-diffusing optical fiber 10 between the input end 11 and the first bend 130, the light 16 scatters from the nanostructured inner and outer cores 30 and 50, thereby generating scattered light 16S. The nanostructured inner and outer cores 30 and 50 have different nanostructure morphologies 32 and 52 and thus different scattering properties. In one embodiment, the nanostructured inner core 30 has less light scattering than the nanostructured outer core 50. This results in more light scattering from the nanostructured outer core 50 than the nanostructured inner core 30, thereby creating a light distribution where more light 16 is traveling in the nanostructured inner core than the nanostructured outer core.

Each bend 130 cause light 16 to couple from the nanostructured inner core 30 to the nanostructured outer core 50, thereby replenishing the nanostructured outer core with new light 16, which is then strongly scattered. In an example, each bend 130 causes a redistribution of the guided modes that more closely resembles the distribution of light 16 at the input end 11 of light-distribution fiber 10, but with less intensity overall. This configuration allows for the scattered light 16S to propagate over longer lengths than for a light-diffusing optical fiber that has a core with a single nanostructured region.

The strength of the bend 130 (e.g., the bend radius), the scattering strength, and the areas $A_{30}$ and $A_{50}$ of the respective nanostructured inner and outer cores 30 and 50, as well as the size of isolation region 40 (including no isolation region) determine the intensity distribution I(z') of scattered light 16S as a function of distance z' along the fiber. Bends 130 need not be very tight. For example, with reference to FIG. 6B, the bend radius $R_{130}$ for a given bend 130 can be 5 mm to 50 mm and the bending angle $\theta_{130}$ can range from 5° to 90° or even 10° to 45°.

The bends 130 provide unique interaction patterns between the scattering light 16S from the nanostructured inner and outer cores 30 and 50, resulting in illumination characteristics (e.g., an intensity distribution I(z')) that are not achievable in a light-diffusing fiber that has a core with a single nanostructured region.

Figure 7A:
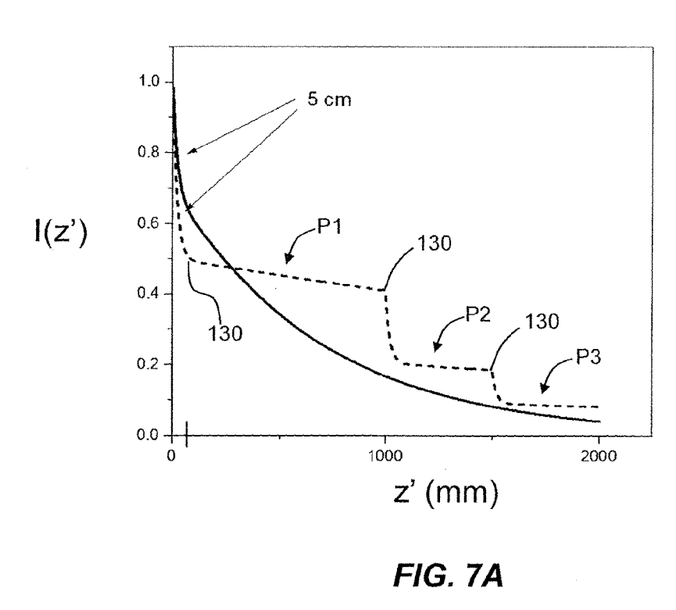
FIG. 7A is a plot of the normalized intensity I(z') as a function of the localized coordinate z' along the length of the light-diffusing optical fiber for a straight (i.e., non-bend) configuration (solid line) and for the same light-diffusing optical fiber with a bend configuration (dashed line), such as shown in FIG. 6B.

FIG. 7A is a plot of the normalized intensity I(z') as a function of the localized coordinate z' along the length of the light-diffusing optical fiber 10 having bend configuration such as shown in FIG. 6B. The solid line indicates the straight or non-bend configuration of the light-diffusing optical fiber 10 as shown in FIG. 6A, wherein the intensity I(z') drops off exponentially with distance z' along the fiber. The dashed line shows a sharp drop in the initial intensity due to scattered light 16S being generated in both of the nanostructured inner and outer cores 30 and 50.

When the first bend 130 is encountered, the aforementioned coupling and redistribution of light 16 between the nanostructured inner and outer cores 30 and 50 occurs, resulting in more scattered light 16S being emitted, as evidenced by the plateau P1 in the I(z') curve. Plateau P1 is not necessarily flat and has a slight downward slope that is less steep than the corresponding portion of the solid-line curve.

At the second bend 130, the intensity I(z') drops sharply but then recovers at a second plateau P2 as another redistribution of light 16 occurs within the nanostructured core 20. This pattern repeats at the third bend 130, which forms the third plateau P3. Note that the overall intensity I(z) is higher on average over the given length of the light-diffusing optical fiber 10 when the fiber has bends (dashed line) than when the fiber is straight. In other embodiments that utilized bends 130, the dashed line that represents the intensity of the outputted scattered light 16S is above the solid line for all values of z'.

Figure 7B:
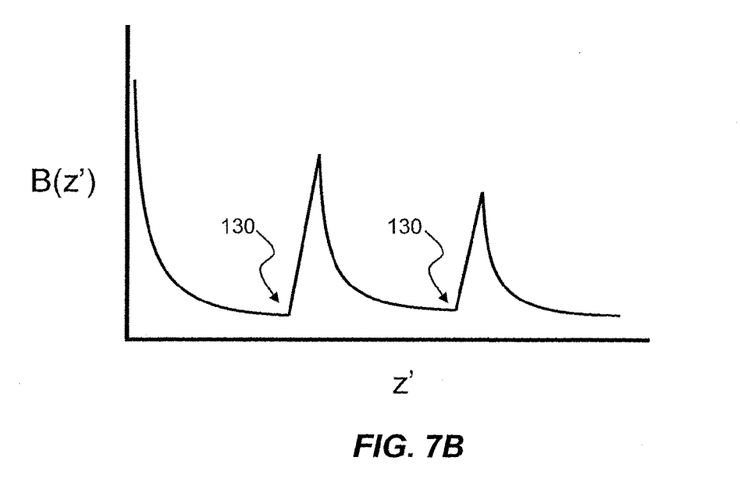
FIG. 7B is an example plot of the brightness B(z') (arbitrary units) as a function of the local coordinate z' illustrating how the bends in the light-diffusing optical fiber can be used to create spikes in the brightness distribution along the fiber length.
Figure 7C:
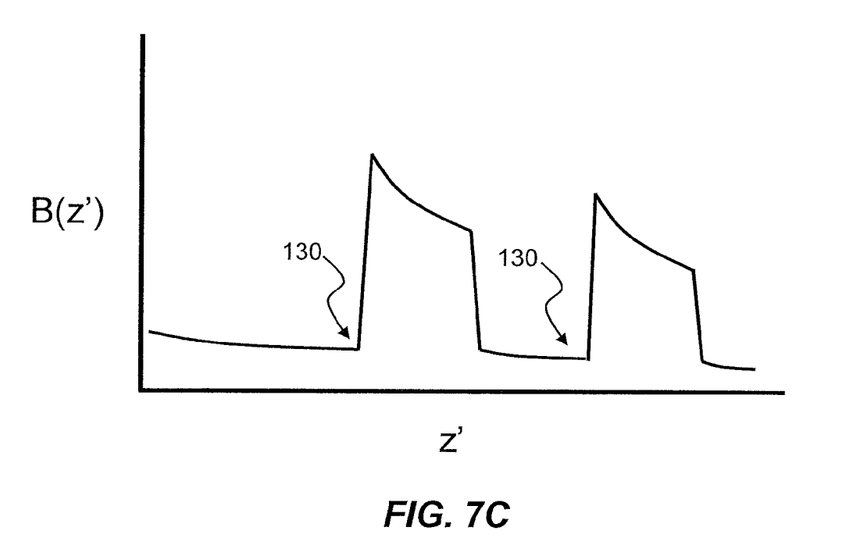
FIG. 7C is similar to FIG. 7B and illustrates an example of a bend configuration for the light-diffusing fiber that has a low average brightness with high-brightness sections at each bend.

FIG. 7B is an example plot of the brightness B(z') (arbitrary units) as a function of the local coordinate z' illustrating how the bends 130 can be used to create spikes in the brightness distribution along the fiber length. For single-end illumination (FIG. 6A) that launches light 16 into a low-scattering section of the nanostructured core 20 (say, the nanostructured inner core 30), a brightness B(z') such as shown in FIG. 7C can be generated, i.e., a low average brightness with high-brightness sections at each bend 130.

Figure 6C:
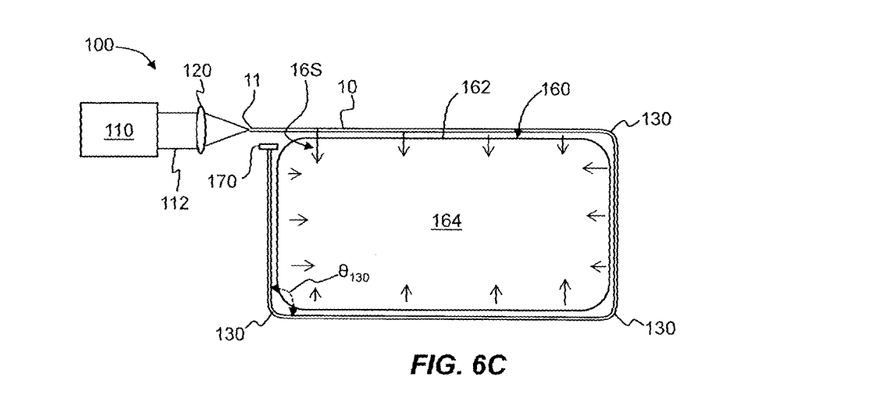
FIG. 6C is similar to FIG. 6B and illustrates an embodiment of the light-diffusing optical system wherein the light-diffusing optical fiber has a bend configuration and is operably disposed with respect to a cover glass of a device.

Depending on width $\Delta r$ of isolation region 40 and its refractive index $n_{40}$, one can obtain different amounts of light coupling between the nanostructured inner and outer cores 30 and 50 by different amounts of bending 130 (as noted above, the light coupling depends on other factors as well). A typical deployment for tablet or cell phone application is illustrated in FIG. 6C, wherein the light-diffusing optical system 100 is configured with light-diffusing optical fiber 10 operably disposed with respect to a device 160, and in particular about a perimeter 162 of a light-receiving substrate 164, such as a coverglass, transparent sheet, etc. The example bend configuration of FIG. 6C includes three bends 130 having a bend angle $\theta_{130}$ of 90 degrees. This results in a brightness distribution similar to that shown in FIG. 7B, with the fiber being brighter after each bend 130 due to the coupling of the light into the high-loss region of the nanostructure core. Two-sided illumination can be used to make the intensity I(z') symmetric. In an example, a light-reflecting member 170 can be used as shown to improve the illumination uniformity.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present disclosure without departing from the spirit and scope of the same. Thus, it is intended that the present disclosure cover the modifications and variations of this disclosure provided they come within the scope of the appended claims and their equivalents.

We claim:

1. A light-diffusing optical fiber, comprising:
   a) a nanostructured core that includes:
   i) a nanostructured inner core region having a refractive index $n_{30}$ and defined by a first configuration of voids that defines a first amount of light scattering;
   ii) at least one nanostructured outer core region that surrounds the nanostructured inner core region and that has a refractive index $n_{50}$ and that is defined by a second configuration of voids that defines a second amount of light scattering that is different from the first amount of light scattering; and
   b) a cladding that surrounds the nanostructured core.

2. The light-diffusing optical fiber according to claim 1, wherein the first amount of light scattering is less than the second amount of light scattering.

3. The light-diffusing optical fiber according to claim 1, wherein the first amount of light scattering is greater than the second amount of light scattering.

4. The light-diffusing optical fiber according to claim 1, further including at least one annular isolation region between the nanostructured inner core region and the at least one outer core region, wherein the isolation region is solid and has a refractive index $n_{40} > n_{30}$, and a radial width $\Delta r$ in the range 1 µm ≤ $\Delta r$ ≤ 10 µm.

5. The light-diffusing optical fiber according to claim 4, wherein the nanostructured core has a radius $r_{20}$ in the range from 50 µm ≤ $r_{20}$ ≤ 250 µm.

6. The light-diffusing optical fiber according to claim 4, wherein the nanostructured inner core region has a radius $r_{30}$ in the range from $(0.1) \cdot r_{20} \leq r_{30} \leq (0.75) \cdot r_{20}$.

7. The light-diffusing optical fiber according to claim 1, wherein the at least one nanostructured outer core region includes a plurality N of nanostructured outer core regions, and wherein the nanostructured core includes a plurality N of isolation regions, with one of the N isolation regions disposed between the nanostructured inner core region and an innermost one of the nanostructured outer core regions.

8. A light-diffusing optical system, comprising:
   the light-diffusing optical fiber according to claim 1; and
   a light source optically coupled to the light-diffusing optical fiber.

9. The light-diffusing optical system according to claim 8, wherein the light source emits light that is coupled into the light-diffusing optical fiber to travel through the nanostructured core, wherein the light diffusing optical fiber has an outer surface, wherein the nanostructured inner core region and the nanostructured outer core region each scatter the light from the nanostructured core as scattered light, and wherein the light-diffusing optical fiber includes at least one bend that increases an amount of light scattered emitted through the outer surface as compared to when the at least one bend is absent.

10. The light-diffusing optical system according to claim 9, wherein the light-diffusing optical fiber is operably arranged about a perimeter of a light-receiving substrate.

11. A light-diffusing optical fiber, comprising:
    a nanostructured inner core region having a first nanostructure morphology of voids that defines a first amount of light scattering;
    a nanostructured outer core region that surrounds the inner core region and that has a second nanostructure morphology of voids that defines a second amount of light scattering different from the first amount of light scattering;
    an isolation region disposed between the nanostructured inner and outer core regions and having an annular width 1 µm ≤ $\Delta r$ ≤ 10 µm; and
    a cladding region surrounding the nanostructured outer core region.

12. The light-diffusing optical fiber according to claim 11, wherein the first amount of light scattering is less than the second amount of light scattering.

13. The light-diffusing optical fiber according to claim 11, wherein the first amount of light scattering is greater than the second amount of light scattering.

14. A light-diffusing optical system, comprising:
the light-diffusing optical fiber according to claim 11, wherein the light-diffusing optical fiber has a bend configuration that includes at least one bend; and
a light source optically coupled to the light-diffusing optical fiber.

15. A method of providing illumination from a light-diffusing optical fiber having an outer surface, comprising: coupling light into a nanostructured core of the light-diffusing optical fiber, wherein the nanostructured core has a nanostructured inner core region having a first amount of light scattering and a nano structured outer core region that surrounds the nanostructured inner core region and having a second amount of light scattering; allowing the light to propagate down a length of the nanostructured core and scatter from the nanostructured core as scattered light that exits the outer surface of the light-diffusing optical fiber; and bending the light-diffusing optical fiber to cause light to be transferred from the nanostructured inner core region to the nanostructured outer core region, thereby increasing an amount of scattered light exiting the outer surface as compared to not bending the light-diffusing optical fiber wherein the nano structured inner core region has a refractive index $n_{30}$, the nano structured outer core region has a refractive index $n_{50}$, and further including at least an annular isolation region between the nanostructured inner core region and the at least one outer core region, wherein the isolation region is solid and has a refractive index $n_{40} > n_{30}$, $n_{50}$, and a radial width $\Delta r$ in the range $1\ \mu m \leq \Delta r \leq 10\ \mu m$.

16. A method according to claim 15, further including operably arranging the light-diffusing optical fiber about a perimeter of a light-receiving substrate.

17. The method according to claim 15, wherein the first amount of light scattering is less than the second amount of light scattering.

18. The method according to claim 15, wherein the first amount of light scattering is greater than the second amount of light scattering.

19. The method according to claim 15, wherein the nanostructured core has a radius $r_{20}$ in the range from $50\ \mu m \leq r_{20} \leq 250\ \mu m$.

* * * * *

UNITED STATES PATENT AND TRADEMARK OFFICE
CERTIFICATE OF CORRECTION

PATENT NO. : 10,215,914 B2
APPLICATION NO. : 14/919034
DATED : February 26, 2019
INVENTOR(S) : Stephan Lvovich Logunov et al.

Page 1 of 1

It is certified that error appears in the above-identified patent and that said Letters Patent is hereby corrected as shown below:

In the Claims

In Column 13, Line 12 (approx.), Claim 15, delete "nano structured" and insert -- nanostructured --, therefor.

In Column 14, Line 2, Claim 15, delete "nano structured" and insert -- nanostructured --, therefor.

In Column 14, Line 3, Claim 15, delete "nano structured" and insert -- nanostructured --, therefor.

Signed and Sealed this
Twenty-ninth Day of October, 2019

Andrei Iancu
*Director of the United States Patent and Trademark Office*